(12) United States Patent
Anderson et al.

(10) Patent No.: US 10,232,685 B2
(45) Date of Patent: Mar. 19, 2019

(54) AUTOMOTIVE INTERIOR AIR QUALITY CARBON CANISTER STATUS AND REPLACEMENT/REGENERATION CONTROL

(71) Applicant: Ford Global Technologies, LLC, Dearborn, MI (US)

(72) Inventors: James Eric Anderson, Dearborn, MI (US); Timothy John Wallington, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 15/423,907

(22) Filed: Feb. 3, 2017

(65) Prior Publication Data
US 2018/0222290 A1 Aug. 9, 2018

(51) Int. Cl.
| | | |
|---|---|---|
| *B01D 53/04* | (2006.01) | |
| *B60H 3/06* | (2006.01) | |
| *B01D 46/42* | (2006.01) | |
| *B01D 46/00* | (2006.01) | |
| *B01D 46/46* | (2006.01) | |

(52) U.S. Cl.
CPC ....... *B60H 3/0633* (2013.01); *B01D 46/0036* (2013.01); *B01D 46/0063* (2013.01); *B01D 46/4263* (2013.01); *B01D 46/46* (2013.01); *B01D 53/0454* (2013.01); *B60H 3/06* (2013.01); *B01D 2257/708* (2013.01); *B01D 2259/40009* (2013.01); *B01D 2259/40096* (2013.01); *B01D 2259/4566* (2013.01); *B60H 2003/0683* (2013.01); *B60H 2003/0691* (2013.01)

(58) Field of Classification Search
CPC ............. B60H 3/0633; B60H 3/06; B60H 2003/0683; B60H 2003/0691; B01D 46/0036; B01D 46/0063; B01D 46/4263; B01D 46/46; B01D 53/04; B01D 53/0454; B01D 2253/102; B01D 2253/104; B01D 2253/108; B01D 2257/708; B01D 2259/4566; B01D 2259/40009; B01D 2259/40096
USPC ...... 96/109, 111, 143, 146, 417; 95/1, 8, 11, 95/148; 123/198 E
See application file for complete search history.

(56) References Cited

U.S. PATENT DOCUMENTS

| | | | | |
|---|---|---|---|---|
| 4,696,225 A | * | 9/1987 | Weller ................. | B60H 3/0633 454/158 |
| 4,702,753 A | | 10/1987 | Kowalczyk | |
| 4,816,043 A | * | 3/1989 | Harrison ............ | B01D 53/0454 96/112 |
| 5,021,071 A | * | 6/1991 | Reddy .............. | B60K 15/03504 123/518 |
| 5,256,103 A | | 10/1993 | Abthoff et al. | |
| 5,938,523 A | * | 8/1999 | Khelifa ................ | B60H 3/0633 454/156 |

(Continued)

*Primary Examiner* — Frank M Lawrence, Jr.
(74) *Attorney, Agent, or Firm* — Vichit Chea; Price Heneveld LLP

(57) ABSTRACT

An air filtration system for a passenger compartment of a motor vehicle includes a filter bed positioned downstream from a blower motor and upstream from one or more vents. The air filtration system additionally includes a heater coupled to the filter bed, a sensor configured to measure a functional capacity of the filter bed, and a controller configured to regenerate the filter bed using the heater as initiated by the real-time sensor.

20 Claims, 8 Drawing Sheets

(56) References Cited

U.S. PATENT DOCUMENTS

| | | | |
|---|---|---|---|
| 6,197,097 B1 * | 3/2001 | Ertl | B01D 53/0407 |
| | | | 96/129 |
| 6,199,397 B1 * | 3/2001 | Khelifa | B60H 3/0633 |
| | | | 62/239 |
| 6,206,775 B1 | 3/2001 | Lemaitre et al. | |
| 7,789,949 B2 * | 9/2010 | Sparks | F04B 37/04 |
| | | | 252/181.2 |
| 8,394,172 B2 | 3/2013 | Bierl et al. | |
| 9,120,043 B2 | 9/2015 | Johansson et al. | |
| 2003/0089238 A1 * | 5/2003 | Viereck | H01F 27/14 |
| | | | 96/111 |
| 2013/0340724 A1 * | 12/2013 | Nakano | F02M 25/0854 |
| | | | 123/519 |

* cited by examiner

AUTOMOTIVE INTERIOR AIR QUALITY CARBON CANISTER STATUS AND REPLACEMENT/REGENERATION CONTROL

FIELD OF THE INVENTION

The present invention generally relates to an air filtration system for a passenger compartment of a motor vehicle, and more specifically, an air filtration system that may be conditioned to extend the life of the filter.

BACKGROUND OF THE INVENTION

The existence of airborne contaminants has led to the development of better cabin air filters to be used with ventilation systems of automotive vehicles over the years. Many of the cabin filters currently in use are replaceable and may need to be changed when they become clogged with filtered particles, volatile organic compounds (VOCs), dirt, and/or debris. Dedicated sensing systems are known that can identify the filter state and provide an indication to the user to let them know when an air filter needs to be replaced. The known systems in the prior art use combinations of dedicated sensors (such as a pressure sensor for determining pressure drop across a filter) and special housing design features (such as an air bypass channel) to monitor the air flow of the respective filters.

Many of these filtration systems currently used have proven costly and require valuable packaging space in addition to adding an excessive amount of weight to the vehicle. In addition, existing filtration systems and their respective sensors add complexity to the manufacturing of the automotive heating, ventilation, and air conditioning (HVAC) system. Consequently, many vehicles are manufactured without any automatic monitoring systems in place to report on the state of the air filter. Rather, the manufacturer provides written recommendations to the user to replace the filter after a certain period of time or after a predetermined number of miles driven. These recommendations are determined based upon average conditions, so any particular user may have a clogged filter before expiration of the recommended interval or they may end up replacing an unclogged filter unnecessarily. Therefore, improved methods and sensing systems to monitor the state of an air filter with reduced weight and accurate sensors are desired by the current automotive market.

SUMMARY OF THE INVENTION

According to one aspect of the present invention, an air filtration system for a passenger compartment of a motor vehicle is provided. The air filtration system includes a filter bed, a blower motor, one or more vents, a heater coupled to the filter bed, a sensor configured to measure a functional capacity of the filter bed, and a controller configured to regenerate the filter bed using the heater as initiated by the sensor.

According to another aspect of the present invention, a method of providing filtered air to a passenger compartment of a motor vehicle is provided. The method includes circulating an air flow through a filter bed using a blower motor, monitoring a functional capacity of the filter bed with a sensor, and regenerating the filter bed with a heater and reversing the air flow outside of the passenger compartment.

According to another aspect of the present invention, a method of providing filtered air in a motor vehicle is provided. The method includes circulating an air flow through an activated carbon filter using a blower motor, monitoring a VOC loading in the activated carbon filter using a sensor, heating and backflushing the activated carbon filter using a heating element and the blower motor to form a regenerated carbon filter, and subsequently circulating the air flow through the regenerated carbon filter using the blower motor.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
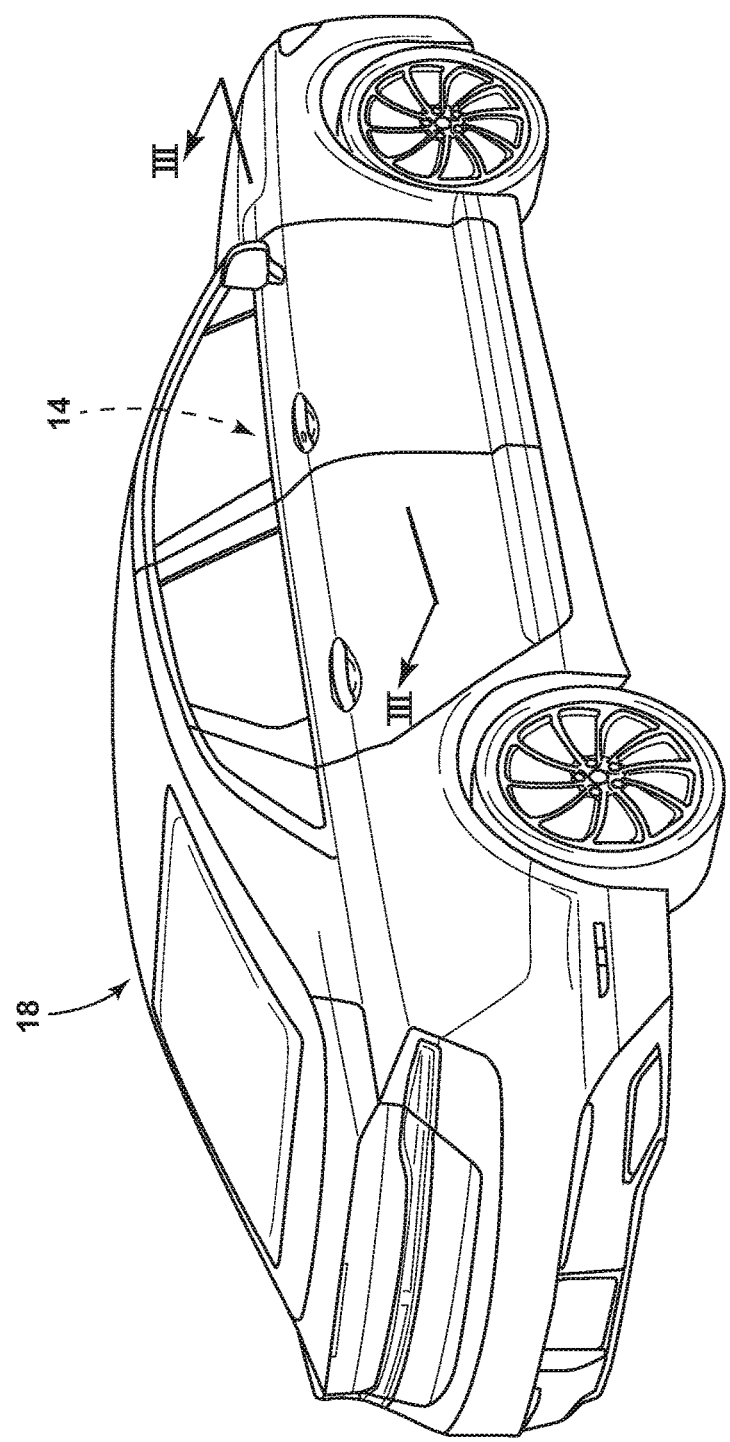
FIG. 1 is an isometric backside perspective view of a vehicle engaged with an HVAC and air filtration system according to one embodiment.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-8, reference numeral 10 generally designates an air filtration system for a passenger compartment 14 of a motor vehicle 18. The air filtration system 10 includes a filter bed 22 that may be positioned downstream or upstream from a blower motor 26 and upstream from one or more vents 30. The air filtration system 10 additionally includes a heater 34 coupled to the filter bed 22, a sensor, in particular a real-time sensor 38 configured to measure a functional capacity of the filter bed 22, and a controller 42 configured to regenerate the filter bed 22 using the heater 34 as initiated by the real-time sensor 38.

Adsorbents have a fixed capacity for removing VOCs or other contaminants from air. As this capacity is approached, the adsorbent's effectiveness can be greatly diminished resulting in VOCs passing through the adsorbent without being captured. The device and related methods disclosed herein present the ability to assess the functional capacity of an adsorbent, in particular, an adsorbent having a measurable electrical resistance using the sensor 38. In some embodiments, measuring the electrical resistance of an adsorbent is performed using a real-time sensor 38. The difference between the sensor and the real-time sensor 38, as used herein, is the real-time sensor 38 continuously measures the functional capacity of the filter bed 22 during operation of the vehicle while other sensors may only measure the functional capacity at predetermined or set times. In other embodiments, other sensing techniques known in the art may be used to assess the functional capacity of the adsorbent.

The real-time sensor 38 measures the overall electrical resistivity of the adsorbent and uses this real-time sensor data to determine when to regenerate the adsorbent. Regeneration may be accomplished by heating and backflushing the adsorbent with air to flush the VOCs to the environment outside of the vehicle. In some embodiments, the regeneration step may be performed in an off-line mode when the motor vehicle 18 is not being used. By collecting real-time data about the available capacity of the adsorbent to determine when to regenerate the adsorbent, the following advantages may be obtained: 1) elimination of the need to replace the adsorbent; 2) prevention of exceeding the functional capacity of the adsorbent; 3) optimization of the size and amount of adsorbent used in the filter bed 22; and 4) the ability to obtain an improved and consistent air quality inside the passenger compartment 14 throughout the lifetime of the motor vehicle 18.

Referring now to FIG. 1, the motor vehicle 18 has the passenger compartment 14 configured to accommodate one or more passengers. The passenger compartment 14 may be enclosed to separate an internal environment for the one or more passengers separate from an external environment outside of the motor vehicle 18. In some instances, the one or more passengers may desire or expect an improved air quality inside the passenger compartment 14 as compared to the external environment.

Figure 2:
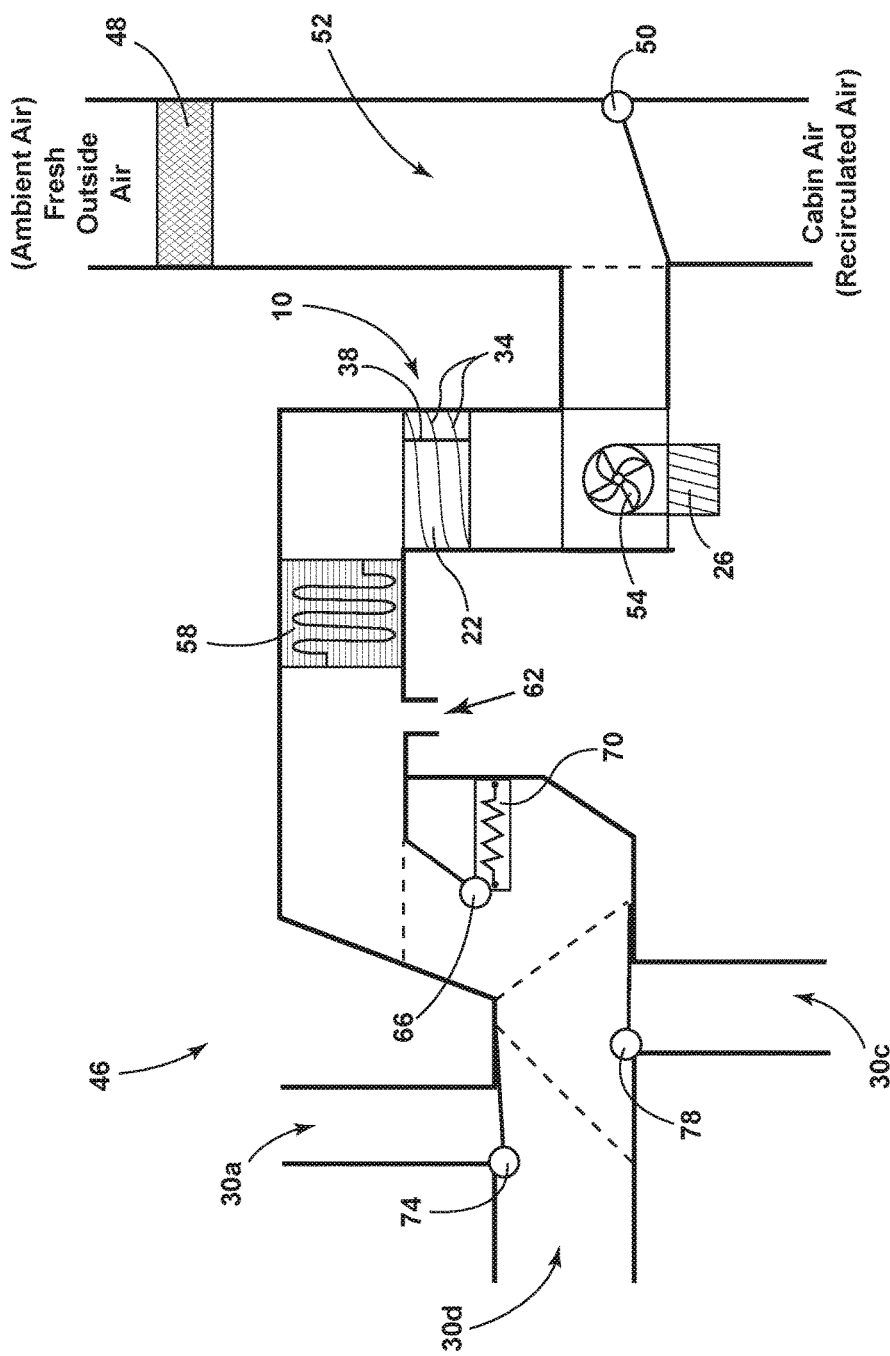
FIG. 2 is a partially schematic cross-sectional view of the HVAC system according to one embodiment.

With reference to FIG. 2, an HVAC system 46 conditions and filters fresh outside air (ambient air) and/or cabin air (recirculated air), at least partially, through the use of the air filtration system 10. The ambient air many be first passed through a cabin air filter 48 where a recirculation flap 50 may be positioned to control the input of ambient air and/or recirculated air into a ductwork 52 of the HVAC system 46. The air is circulated through the ductwork 52 of the HVAC system 46 using the blower motor 26 coupled to a fan 54. The blower motor 26 and fan 54 circulate air through the filter bed 22 where the filter bed 22 is coupled to the real-time sensor 38 and heater 34. Once the air has circulated through the filter bed 22, the air may continue through an evaporator core 58 (cabin air conditioner) that includes an evaporator drain 62 and the air may continue on to a blending flap 66 that directs the air through a heater core 70 (cabin heater) or to the one or more vents 30. The one or more vents 30 may include, for example, defrost vents 30a, main upper vents 30b, and/or floor vents 30c. The conditioned and filtered air may be directed to the one or more vents 30 through the use of a first mode flap 74 and/or a second mode flap 78. The ductwork 52 and components shown in FIG. 2 for the HVAC system 46 are only meant as exemplary, the connectivity and components may be arranged in any configuration known in the art based on the desired application.

Figure 3:
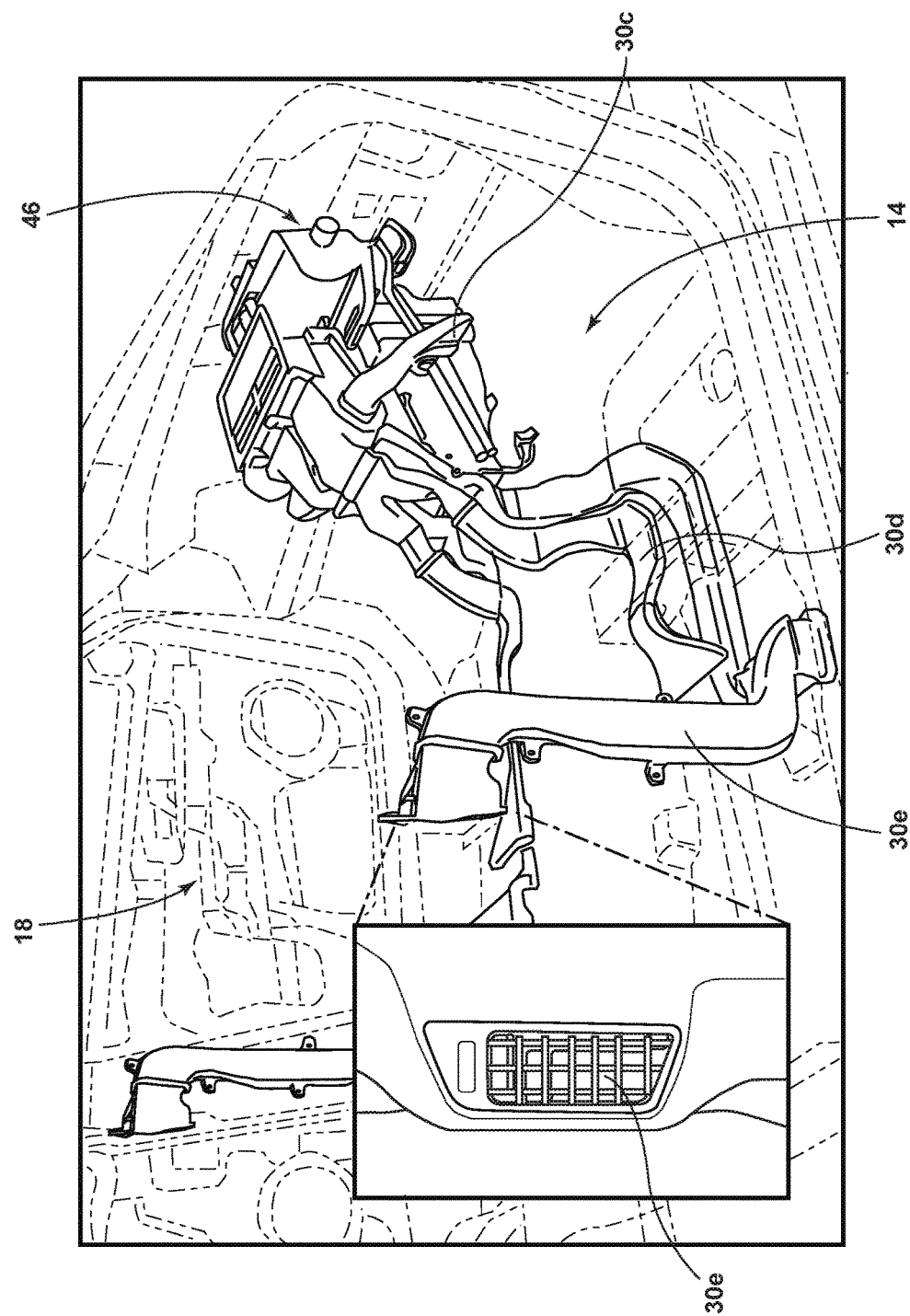
FIG. 3 is a partially schematic cross-sectional view of a passenger compartment taken along the line III-III in FIG. 1.

Referring now to FIG. 3, a partially schematic view of the HVAC system 46 is shown positioned in the passenger compartment 14 of the motor vehicle 18. The one or more vents 30 are shown extending from the HVAC system 46 throughout the passenger compartment 14 to circulate conditioned and/or filtered air to the various regions of the passenger compartment 14. The floor vent 30c circulates air into a foot well for the front seat passengers, rear floor vents 30d circulate air to a floor section in the rear of the motor vehicle 18, and rear side vents 30e circulate air directly into the midsection of the rear seating area. The position and location of the one or more vents 30 may be varied based on the desired circulation and dimensions of the passenger compartment 14 in the respective motor vehicle 18. The number, location, size, and geometry of the one or more vents 30 may be varied depending on the desired application.

Figure 4:
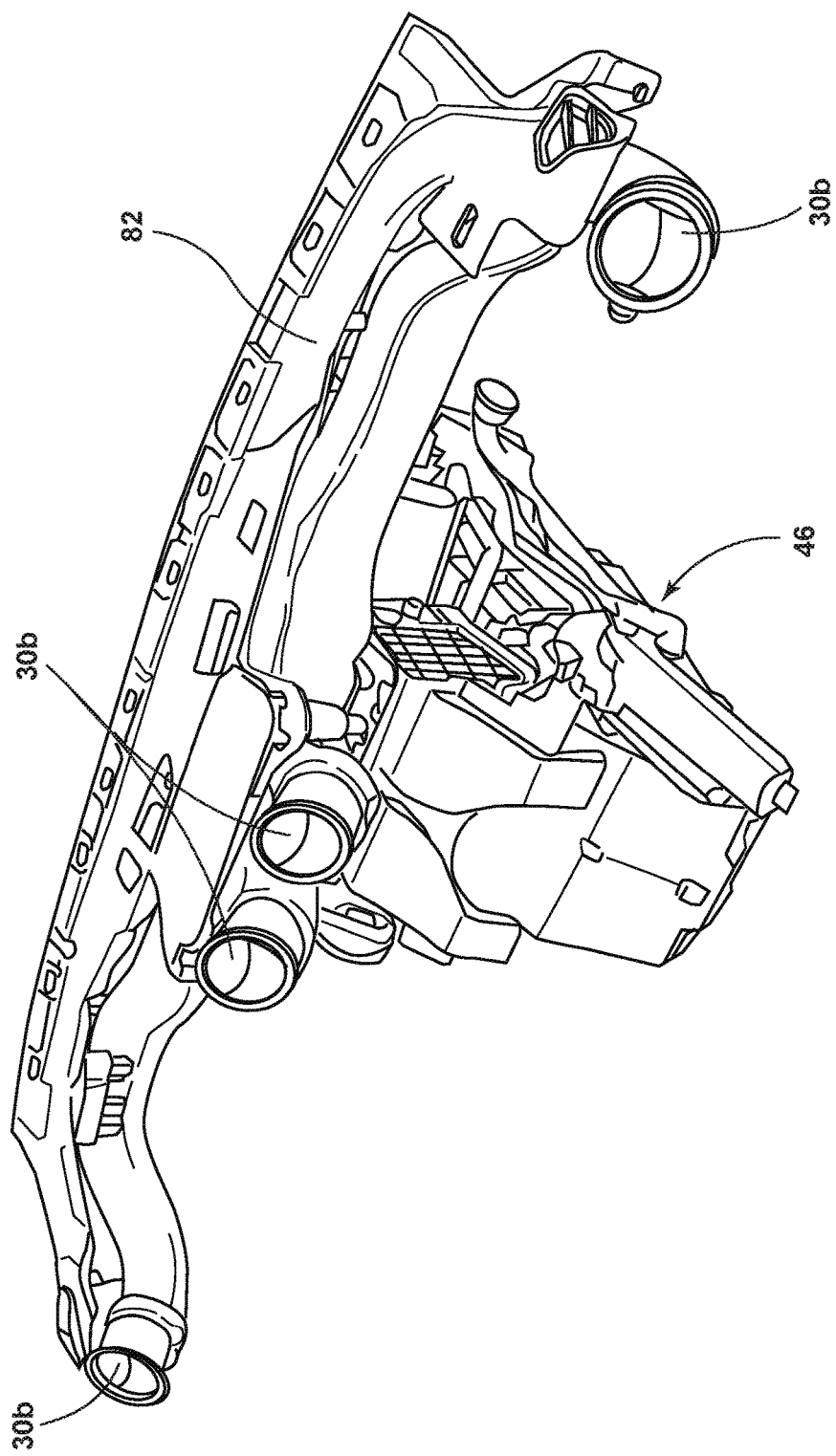
FIG. 4 is a partially schematic isolated view of a dash panel and an HVAC system according to one embodiment.

Referring now to FIG. 4, the HVAC system 46 is shown as a partially schematic view including a dash panel 82 and a plurality of main upper vents 30b. The number, geometry, position, and general aesthetics may be varied depending on the circulation desired for the passenger compartment 14 in the motor vehicle 18.

Figure 5:
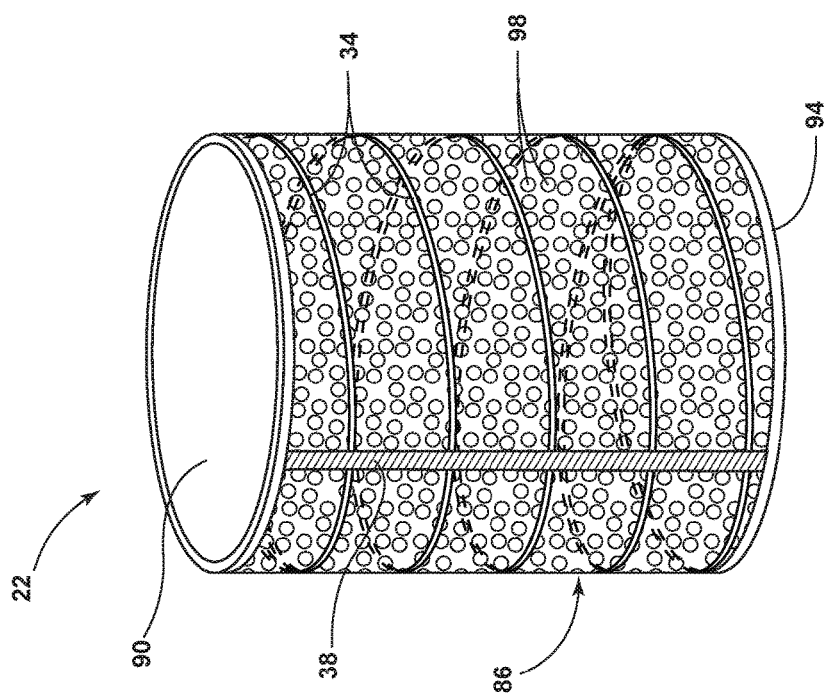
FIG. 5 is a partially schematic isolated view of a filter bed employed in the air filtration system according to one embodiment.

Referring now to FIG. 5, the filter bed 22 is shown according to some embodiments. The filter bed 22 includes a filter body 86 having a porous top cover 90 and a porous bottom cover 94 configured to let air pass through. The filter body 86 may have the heater 34 coupled around the outside surface or perimeter of the filter bed 22. In some embodiments, the heater 34 is an electrically resistive coil that may be wound along the outside length of the filter body 86. In other embodiments, the heater 34 may be a sleeve or a pocket covering at least a portion of the filter bed 22 or filter body 86. In still other embodiments, the heater 34 may be a plurality of electrodes used to pass a current through the filter bed 22. The electrically resistive coil may have a current provided by the electrical system of the motor vehicle 18 that is conducted across the coil to generate heat to volatilize the VOCs and other contaminants adsorbed by a filter media 98. In some embodiments, the filter bed 22 includes one or more filter medias 98 where the filter media 98 is made from activated carbon, zeolites, alumina, molecular sieves, cellulosic materials, titanium dioxide, calcium carbonate, inorganic salts, organic salts, or combinations thereof. In some embodiments, the filter media 98 includes an activated carbon.

The real-time sensor 38 is coupled to the filter body 86 and is able to measure the functional capacity of the filter media 98. The term "functional capacity", as defined herein, is meant to describe the amount of VOCs, particles, and/or other contaminants the filter media 98 has adsorbed relative to the filter media's 98 total capacity. For example, the functional capacity is about half when the filter media 98 has adsorbed about half of the total amount of VOCs, particles, and/or other contaminants of its total capacity. In some embodiments, the real-time sensor 38 passes an electrical current through the filter media 98 using circular electrodes positioned at the top, middle, and/or bottom of the filter body 86 where the circular electrodes are in contact with the filter media 98. Not to be bound by theory, the electrical resistivity of the filter media 98 changes as the filter media 98 becomes more loaded with VOCs and/or other contaminants. In some embodiments, the real-time sensor 38 measures the functional capacity of the filter bed 22 using electrical resistance. In additional embodiments, the real-time sensor 38 measures the functional capacity of the filter bed 22 at least once every second, at least once every minute, at least once every hour, at least once every day, or continuously during operation of the motor vehicle 18. In still other embodiments, the filter media 98 may act as a resistor and generate heat as the electrodes from the real-time sensor 38 apply a voltage across the media, thereby providing a means to regenerate the adsorbent.

In some embodiments, the real-time sensor 38 may take measurements at a fixed temperature or be performed without a temperature control if a correction parameter is used for effects of the temperature variation. The electrodes may be placed in a number of different positions to measure the resistivity across the filter media 98 in any cross-section. For example, measuring resistance across the entire filter media 98 can give the depletion of capacity for the entire filter bed 22. In other examples, measuring across the outlet portion of the filter bed 22 during regeneration would measure the extent of regeneration achieved, and would provide feedback information for changing the regeneration conditions. The air flow during regeneration may be generated using the blower motor 26 and appropriately redirecting the flaps 66, 74, 78 (shown in FIG. 2) in the air flow ductwork 52. In some embodiments, the rotational direction of the fan 54 may be reversed to alternate flow of the circulated air.

Figure 6:
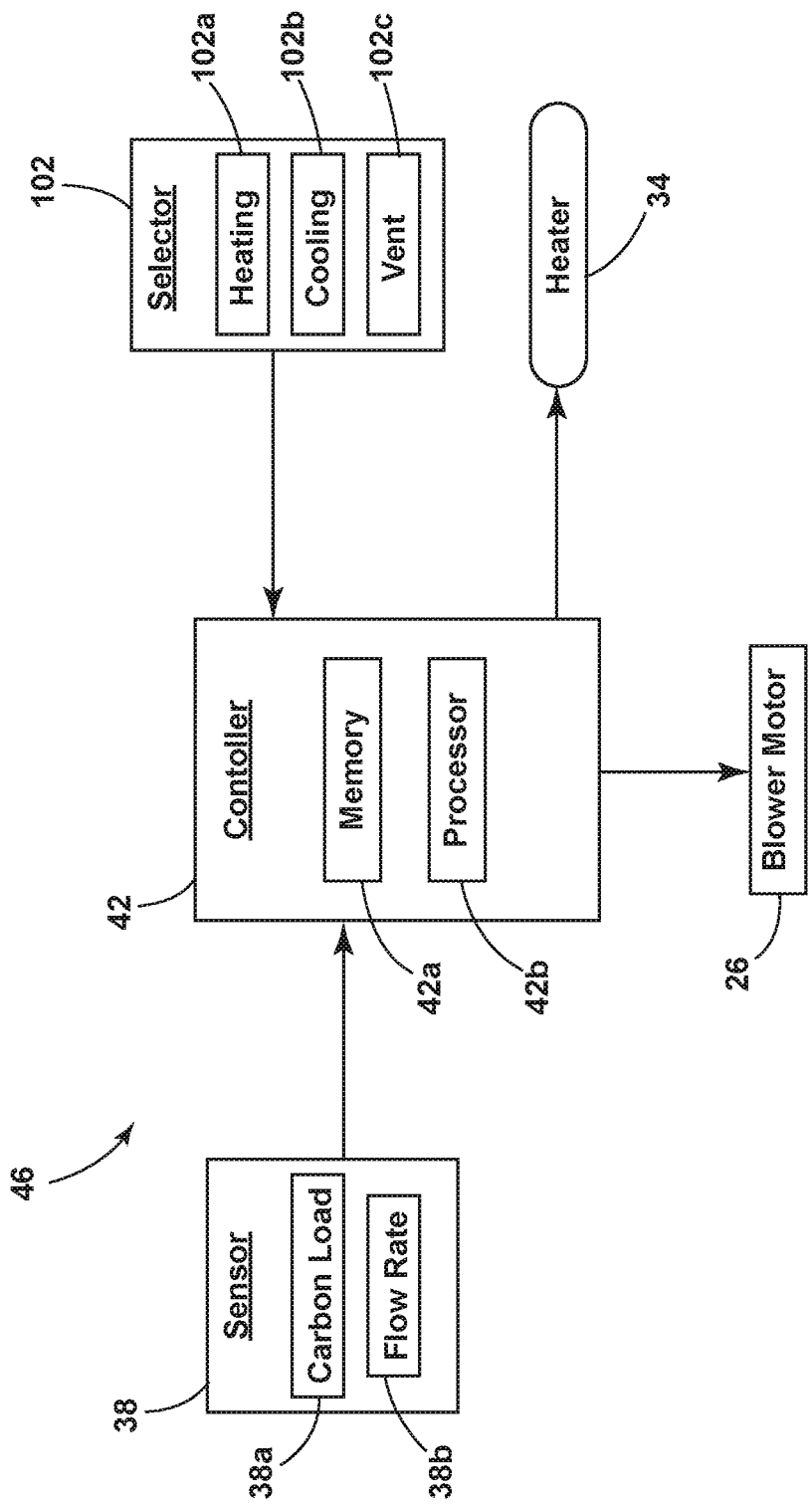
FIG. 6 is a schematic flow diagram of a controller in the air filtration system according to one embodiment.

With reference to FIG. 6, a schematic flow diagram of the controller 42 in communication with one or more selectors 102, one or more sensors 38, the blower motor 26, and the heater 34 is shown for the HVAC system 46. The controller 42 includes a memory 42a which stores instructions executable by a processor 42b. The controller 42 additionally receives input/information about the contaminant saturation of the filter bed 22 from the carbon load 38a and/or flow rate 34b sensors. The controller 42 may also receive input/information from the selector 102 when a user selects a desired circulation method including a heating method 102a, a cooling method 102b, or a vent method 102c. Upon selecting the desired circulation method to be used, the selector 102 sends the input/information concerning the circulation method to the controller 42 where the processor 42b controls the blower motor 26 and the respective recirculation flap 50 and/or blending flap 66. When the sensor 38 detects a stored threshold saturation for the filter media 98 using the carbon load sensor 38a and/or flow rate sensor 38b, the sensor 38 sends input/information to the controller 42 where the processor 42b will initiate the heater 34 and the blower motor 26 to regenerate the filter bed 22. In some embodiments, the regeneration of the filter bed 22 and reversal of the air flow are both initiated by the real-time sensor 38 coupled to a controller 42.

Figure 7:
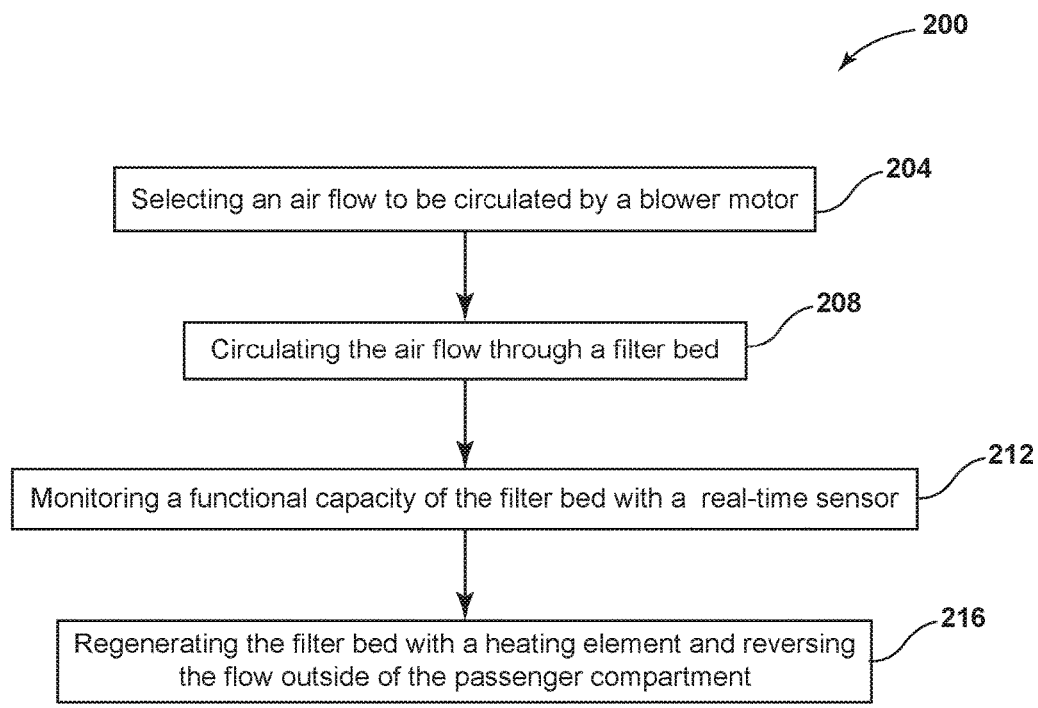
FIG. 7 is a schematic flow diagram illustrating a method for providing filtered air to a passenger compartment of a motor vehicle according to one embodiment.

Referring now to FIG. 7, according to some embodiments, a method 200 is disclosed for providing filtered air to the passenger compartment of the motor vehicle. The method 200 of providing filtered air includes selecting an air flow to be circulated by the blower motor at step 204. The air flow will be circulated through the filter bed 22 at step 208. The functional capacity of the filter bed 22 may be monitored using the real-time sensor 38 at step 212. Once the filter bed 22 reaches a threshold saturation of VOCs and/or other contaminants, the filter bed 22 may be regenerated using the heater 34 and reversing the air flow outside of the passenger compartment 14 using the blower motor 26 at step 216.

It is understood that the descriptions outlining and teaching the air filtration system 10 for the passenger compartment 14 of the motor vehicle 18 previously discussed, which can be used in any combination, apply equally well, where applicable, to the method 200 disclosed for providing filtered air to the passenger compartment of the motor vehicle.

Figure 8:
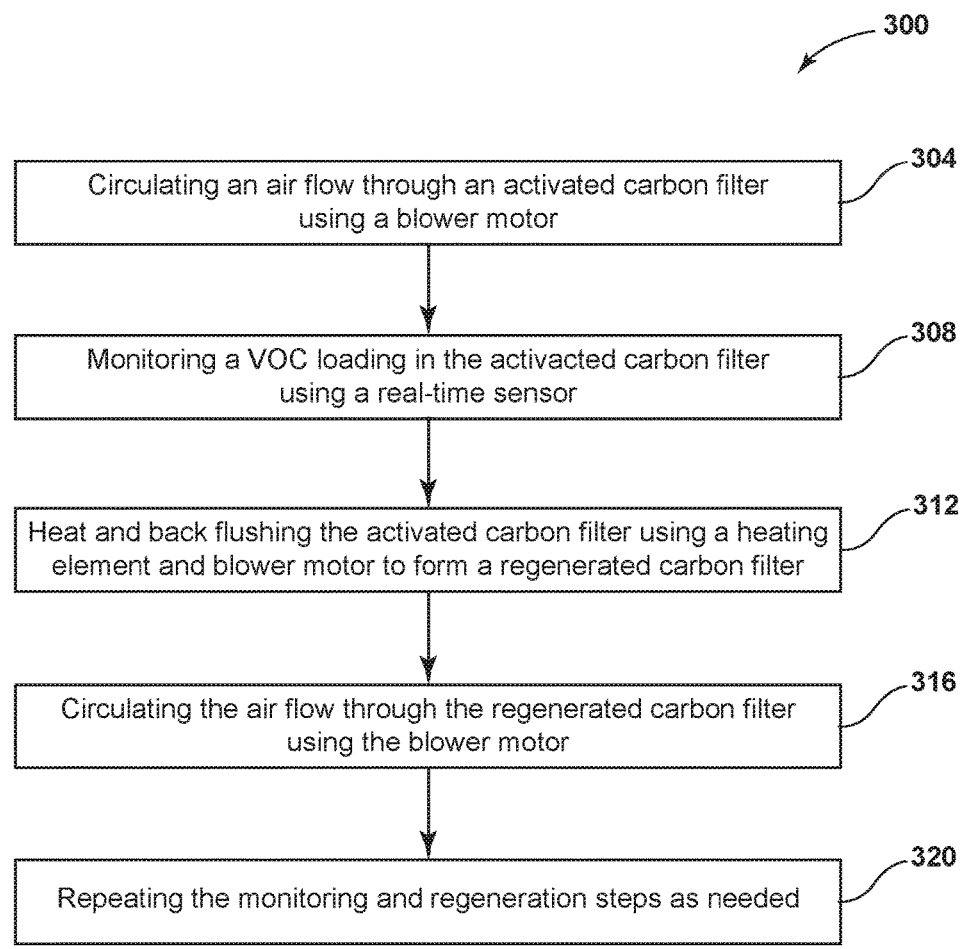
FIG. 8 is a schematic flow diagram illustrating a method of providing filtered air in a motor vehicle according to one embodiment.

Referring now to FIG. 8, according to additional embodiments, a method 300 for providing filtered air in a motor vehicle is provided. The method 300 of providing filtered air includes circulating an air flow through an activated carbon filter 98 using the blower motor 26 at step 304. A VOC loading may be monitored in the activated carbon filter 98 using the real-time sensor 38 at step 308. Once the activated carbon filter 98 is detected to be saturated or meet a threshold value, the activated carbon filter 98 may be heated and/or backflushed with air using the heater 34 and blower motor 26 to regenerate the activated carbon filter and form a regenerated carbon filter at step 312. Once the activated carbon filter 98 has been regenerated, the air flow may again be circulated through the regenerated carbon filter using the blower motor 26 at step 316.

It is understood that the descriptions outlining and teaching the air filtration system 10 for the passenger compartment 14 of the motor vehicle 18 and the method 200 for providing filtered air previously discussed, which can be used in any combination, apply equally well, where applicable, to the method 300 disclosed for providing filtered air to the passenger compartment of the motor vehicle.

The VOC loading is similar to the functional capacity of the activated carbon filter 98 but is instead directly related to the amount of volatile organic compounds rather than other filtered particles, dirt, and/or debris. The regenerated carbon filter should have a VOC loading close to zero and the corresponding filter media 98 should have its entire capacity to again adsorb VOCs, particles, and/or other contaminants until it again reaches at least a portion of its total capacity.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An air filtration system for a passenger compartment of a motor vehicle, comprising:
    a filter bed;
    a blower motor configured to circulate air flow through the filter bed;
    one or more vents;
    a heater coupled to the filter bed;
    a real-time sensor configured to measure a functional capacity of the filter bed; and
    a controller configured to regenerate the filter bed using the heater as initiated by the sensor and to reverse the air flow outside of the passenger compartment.

2. The air filtration system of claim 1, wherein the filter bed comprises activated carbon, zeolites, alumina, molecular sieves, cellulosic materials, titanium dioxide, calcium carbonate, inorganic salts, or combinations thereof.

3. The air filtration system of claim 1, wherein the heater is an electrically resistive coil, a sleeve covering a portion of the filter bed, or a plurality of electrodes that pass a current to the filter bed.

4. The air filtration system of claim 1, wherein the sensor measures the functional capacity of the filter bed using electrical resistance.

5. The air filtration system of claim 1, wherein the air filtration system is positioned upstream from a cabin heater, a cabin air conditioner, or a combination thereof.

6. The air filtration system of claim 1, wherein the controller is coupled to the real-time sensor, the blower motor, and the heater.

7. The air filtration system of claim 1, wherein the sensor is a real-time sensor that measures the functional capacity of the filter bed at least once every minute.

8. A method of providing filtered air to a passenger compartment of a motor vehicle, the method comprising:
    circulating an air flow through a filter bed using a blower motor;
    monitoring a functional capacity of the filter bed with a sensor; and
    regenerating the filter bed with a heater and reversing the air flow outside of the passenger compartment.

9. The method of claim 8, wherein the filter bed comprises activated carbon, zeolites, alumina, molecular sieves, cellulosic materials, titanium dioxide, calcium carbonate, inorganic salts, or combinations thereof.

10. The method of claim 8, wherein the heater is an electrically resistive coil, a sleeve covering a portion of the filter bed, or a plurality of electrodes that pass a current to the filter bed.

11. The method of claim 8, wherein the sensor is a real-time sensor that measures the saturation of the filter bed using electrical resistance.

12. The method of claim 8, wherein the filter bed is additionally positioned upstream from a cabin heater, a cabin air conditioner, or a combination thereof.

13. The method of claim 8, wherein the sensor is a real-time sensor and the controller is coupled to the real-time sensor, the blower motor, and the heater.

14. The method of claim 8, wherein the sensor is a real-time sensor that measures the functional capacity of the filter bed at least once every minute.

15. The method of claim 8, wherein the regeneration of the filter bed and reversal of the air flow are both initiated by the real-time sensor coupled to a controller.

16. The method of claim 15, wherein the controller is in communication with one or more sensors, a selector, a heating element, and the blower motor.

17. A method of providing filtered air in a motor vehicle, the method comprising:
    circulating an air flow through an activated carbon filter using a blower motor;
    monitoring a VOC loading in the activated carbon filter using a sensor;
    heating and backflushing the activated carbon filter using a heating element and the blower motor to form a regenerated carbon filter; and
    circulating the air flow through the regenerated carbon filter using the blower motor.

18. The method of claim 17, wherein the heating and backflushing are both initiated by the real-time sensor coupled to a controller.

19. The method of claim 17, wherein the controller is in communication with one or more sensors, a selector, a heating element, and the blower motor.

20. The method of claim 17, wherein the sensor is a real-time sensor that measures the VOC loading of the filter bed at least once every minute.

* * * * *